H. S. BANKS.
WINDMILL.
APPLICATION FILED JULY 28, 1909.
945,210.
Patented Jan. 4, 1910.
2 SHEETS—SHEET 1.
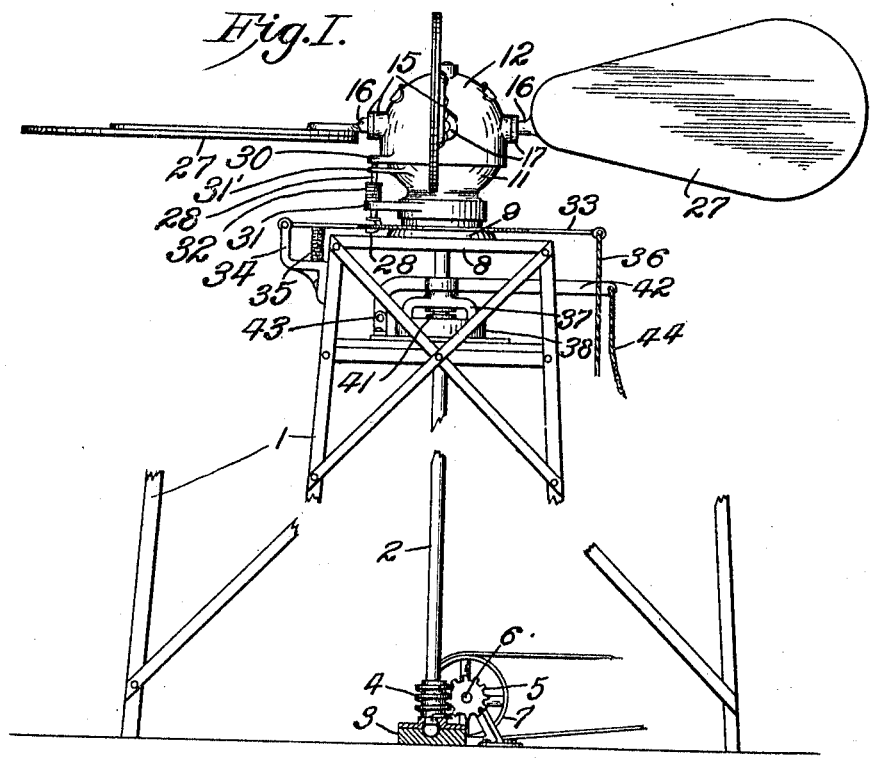
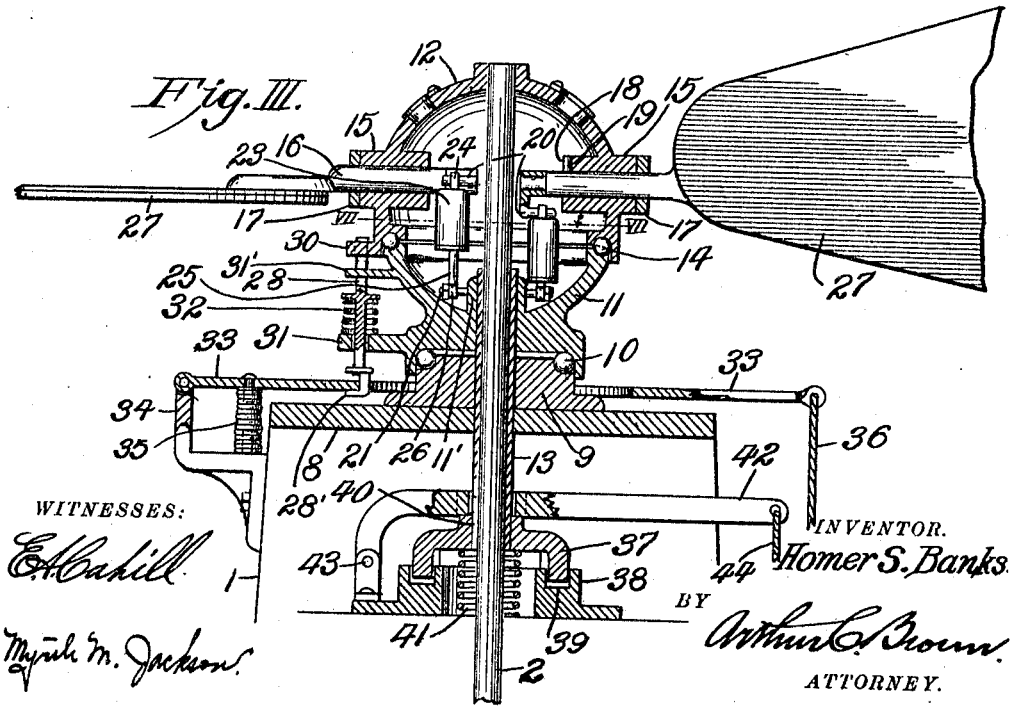
WITNESSES:
INVENTOR.
Homer S. Banks
BY
Arthur C. Brown
ATTORNEY.

H. S. BANKS.
WINDMILL.
APPLICATION FILED JULY 28, 1909.
945,210.
Patented Jan. 4, 1910.
2 SHEETS—SHEET 2.
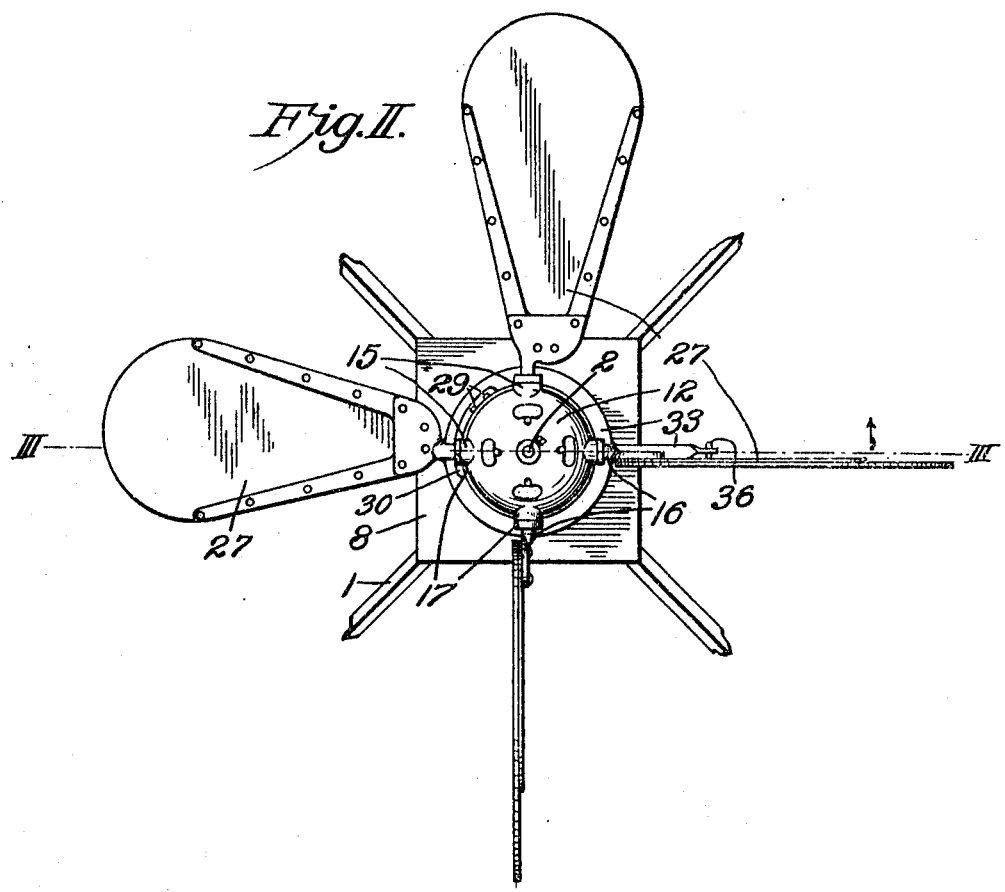
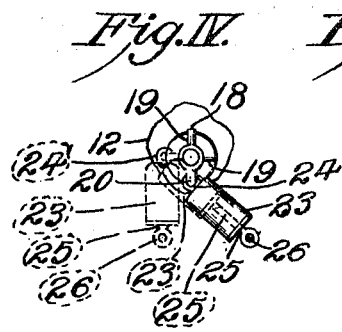
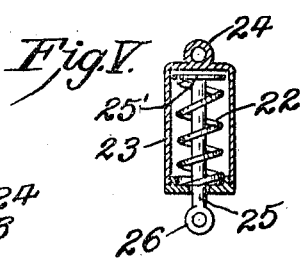
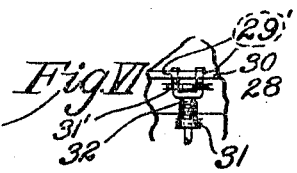
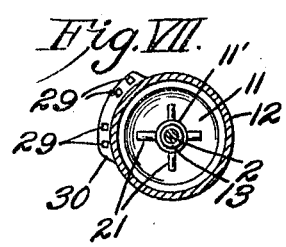
WITNESSES:
INVENTOR.
Homer S. Banks
BY
ATTORNEY.

UNITED STATES PATENT OFFICE.

HOMER S. BANKS, OF SALINA, KANSAS.

WINDMILL.

945,210. Specification of Letters Patent. Patented Jan. 4, 1910.

Application filed July 28, 1909. Serial No. 510,032.

*To all whom it may concern:*

Be it known that I, HOMER S. BANKS, a citizen of the United States, residing at Salina, in the county of Saline and State of Kansas, have invented certain new and useful Improvements in Windmills; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to wind motors and more particularly to the class in which the wind-wheel is mounted upon a vertical shaft.

It is the principal object of the invention to provide a wind motor in which the vanes will be automatically " feathered " or caused to stand edgewise while moving against the wind and vertically while receiving the force of the wind.

It is a feature of this invention that the vanes are feathered by the action of the wind alone, without the use of cams which, in similar motors, materially reduce the power of the motor.

A further object is to provide the improved details of structure which will presently be fully described and pointed out in the claims, reference being had to the accompanying drawings, in which:—

Figure I is a broken-out side elevation of a wind motor constructed according to my invention. Fig. II is a top plan view of the same. Fig. III is a vertical section viewed on line III—III, Fig. II. Fig. IV is a diagrammatic detail view hereinafter explained. Fig. V is a sectional detail view of one of the spring cases. Fig. VI is a detail view of the latch. Fig. VII is a detail section, taken on line VII—VII, Fig. III, showing the latch-plate.

Referring more in detail to the parts:—
1 designates the tower upon which the motor is mounted.

2 is the main shaft by which the power is transmitted downwardly, it being stepped in a bearing 3 and carrying a worm 4, driving a gear 5 on a shaft 6, on which is a pulley 7.

At the top of the tower is a plate or platform 8, on which is fixed a base-plate 9 having a ball-race containing a series of rollers 10. On the antifriction bearing thus provided is mounted the lower part 11 of a housing 11—12. The shaft 2 extends through the parts just named and is surrounded by a short sleeve 13 that passes revolubly through parts 8 and 9 but is secured to part 11 and rotates therewith.

The upper edge of the housing member 11 is formed with a ball-race containing a series of rollers 14, on which is mounted the upper part 12 of the housing. The shaft 2 extends into or through a bore in the top of this member 12 and is secured therein. The shaft rotates independently of the sleeve 13.

The main housing member 12 is formed with equally spaced, radial vane-shaft bearings 15. Vane-shafts 16 are journaled in said bearings, and are held against end motion by collars 17, and also by pins 18, engaging the inner ends of the bearings. The surfaces engaged by said pins are recessed, as shown, thereby forming two stops 19 (Fig. IV), for each pin, to limit the rotary motion of the vane shaft to about 90 degrees. Fixed on the inner end of each vane-shaft is a crank 20, and fixed in a flange 11' of member 11 are studs 21, one for each crank 20. The cranks are drawn toward the studs by suitable springs, which may be either tension or compression type. I prefer to employ compression springs, as shown in Fig. V. The spring 22 is inclosed by a case 23, having an eye 24 adapted for connection with a crank 20. A stem 25, having an eye 26 adapted for connection with a stud 21, passes through the spring and terminates in a head 25'. The spring thus resists any outward pull upon the stem 25, and holds the corresponding vane in operative position at times, with pin 18 bearing against one of the shoulders 19 aforesaid. As clearly shown in the drawings, each vane 27 is mounted unsymmetrically upon its shaft, projecting more above the shaft than below it. By this device I accomplish one desired result, the dropping of the vane (at the proper time) by the force of the wind alone, without the use of mechanism. It is evident that the wind when blowing against the back of a vane will exert greater pressure thereon above than below the shaft. The vanes and springs are to be so proportioned that the difference of air pressure will overcome the spring thereby turning the vane to horizontal position. It will be evident that the tension exerted by said springs 22 will depend upon the relative positions of the upper and lower housing members 11 and 12, and that relative movement thereof will either increase or decrease said tension. To remove said tension when it is desired to stop the motor, is the object of making the housing in two relatively movable parts. The relative position of said parts is controlled by a latch 28, carried by the lower part and taking into holes 29 in a flange 30 on the upper part. The latch is vertical, passes through guides 31—31', and is pressed upward by a spring 32. As shown it is bifurcated, and in the flange 30 are two pairs of openings 29, one for each position of the housing member 11. The lower end of the latch has a hook 28'. The latch is releasable by means of a lever 33, pivoted on a bracket 34, passing around part 11, and pressed upward by a spring 35. A pull cord 36 is attached to said lever and depends to a convenient distance from the ground.

Parts 37, 38, Fig. III, constitute a brake. Both parts are annular, the latter having an annular groove 39 adapted to receive the former. Part 37 is splined on the sleeve 13.

40 designates the feather.

41 is a spring that opens the brake and 42 is a lever for setting the brake manually. Lever 42 is pivoted at 43 and is operated by a depending cord 44. As the sleeve 13 is rigidly secured to the housing member 11, it will be understood that the upper brake member 37 will rotate with the housing when the motor is running, and when the lever 42 is depressed the rotation of said member 37 will be checked, thereby arresting that of the housing and vanes also.

The operation of the vanes in the wind is as follows, when the latch 28 is in operative position: The wind engages the two upright vanes and thereby rotates the housing 11—12 and shaft 2. When the forward vane passes its neutral point and starts to return against the wind, the wind pressure overbalances it and turns it to level position, in which position it remains while moving against the wind. When it reaches an angle at which it is pointing toward the wind, the wind effect decreases sufficiently to permit the spring 22 to restore the vane to upright position. These movements are performed by the vanes in succession. To stop the motor, the attendant pulls the brake cord 44, brings the vanes to rest, then pulls the latch release cord 36. The tension of the springs 22 will cause the top of the housing to turn on the lower part, thereby bringing the other set of latch holes 29 in register with the latch, which, when released, will enter them. There now being no operative means for setting up the vanes, all the vanes will be horizontal. To start the motor, the attendant retracts the latch, holds the brake set to prevent rotation of the lower member of the housing, and turns the shaft until the other set of latch holes 29 is in line with the latch, then releases the latch. The springs 22 are now under tension again, and two or more of the vanes will be turned to upright position.

Having thus described my invention, what I claim as new therein and desire to secure by Letters-Patent is:—

1. In a horizontal wind motor, a hollow head provided with radial bearings for vane shafts, and being fixed upon a vertical rotary shaft; vane shafts provided with cranks within the head, springs within the head for turning the vane shafts to operative positions, and vanes on said shafts.

2. In a horizontal wind motor, a hollow head comprising superposed relatively movable parts having an antifriction bearing therebetween, the upper part being provided with a bearing for a vane shaft and being fixed upon a vertical rotary shaft; a vane shaft projecting into the head and having a crank therein, and a spring attached at one end to said crank and at the other end to the lower part of the head, for the purpose set forth.

3. In a horizontal wind motor, a hollow head comprising superposed relatively movable parts having an antifriction bearing therebetween, the upper part being provided with a bearing for a vane shaft and being fixed upon a vertical rotary shaft; a vane shaft projecting into the head and having a crank therein, and a spring attached at one end to said crank and at the other end to the lower part of the head and movable means for locking the two parts of the head together in different relative positions, for the purpose specified.

4. In a horizontal wind motor, a housing comprising an upper part rotatably mounted upon a lower part, the upper part being fixed upon a vertical rotary shaft and being formed with bearings for vane shafts and having a lateral flange with a plurality of latch openings therein; the lower housing part being provided with guides for a vertically movable latch; a latch held by said guides and adapted to enter said openings, means for disengaging said latch, a vane shaft projecting into the housing and having a crank therein, and a spring connected at one end to said crank and at the other end to the lower part of the housing, said spring being tensioned or untensioned according to the relative positions of the two parts of the housing.

5. In a horizontal wind motor, a vertical power shaft, a sleeve loose on said shaft, a head member fixed upon said sleeve and mounted on antifriction bearings, a movable brake member splined on said sleeve, a fixed brake member adapted to coöperate with said brake member, means for setting the movable brake member, and a spring for releasing the latter.

6. In a horizontal wind motor, a vertical power shaft, a sleeve loose on said shaft, a head member fixed upon said sleeve and mounted on antifriction bearings, a movable brake member splined on said sleeve, a fixed brake member adapted to coöperate with said brake member and having an annular groove adapted to receive the latter.

In testimony whereof I affix my signature in presence of two witnesses.

HOMER S. BANKS.

Witnesses:
E. L. WILDER,
M. E. O'SHEE.